INVENTOR.
Gothard Theodore Moo
BY Elliot A. Salter
Attorney.

United States Patent Office 3,072,233
Patented Jan. 8, 1963

3,072,233
OVERRUNNING CLUTCHES
Gothard Theodore Moo, Cranston, R.I., assignor to Weskenson Corporation, Cranston, R.I., a corporation of Rhode Island
Filed June 29, 1959, Ser. No. 823,635
3 Claims. (Cl. 192—45)

This invention relates generally to overrunning clutches, and is more particularly concerned with the type of overrunning clutch discussed and disclosed in my copending application, Serial No. 558,110, filed January 9, 1956, now U.S. Patent No. 2,892,522, dated June 30, 1959.

More specifically, this invention relates to overrunning clutches having a series of wedging elements, such as rollers or sprags, arranged between a series of camming surfaces on one clutch member and a raceway on the other clutch member. In such clutches, the opposing surfaces of the two clutch members form a series of wedge-like spaces, whereby rotation of one of said members in one direction will cause clutching of said members so that they rotate together as a unit, while rotation in the other direction will result in overrunning.

One of the prime shortcomings which has heretofore existed in clutches of this general type is the tendency of the clutch to wear out due to the many wedging engagements which the rollers or sprags make against the same spots or areas of the clutch members. As will be apparent, each wedging engagement has a tendency to peen the engaged surfaces, thereby causing such wear as to deleteriously interfere with the operation of the clutch and accelerate its wearing out.

It is therefore a primary object of my invention to provide an overrunning clutch wherein wedging engagement of the rollers or sprags at the same spots or areas of the clutch members is minimized as much as possible.

Another important object of this invention is the provision of an overrunning clutch of the character described which not only will wear longer, but which also will be just as efficient in operation as conventional clutches of this type hereinbefore in use, and which may be manufactured substantially as economically.

Still another important object of this invention is the provision of an overrunning clutch of the character described wherein the lands which make up the series of wedge-like spaces are each characterized by a constant rise curvature so that the same wedging action is achieved no matter at what point along the land gripping takes place.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
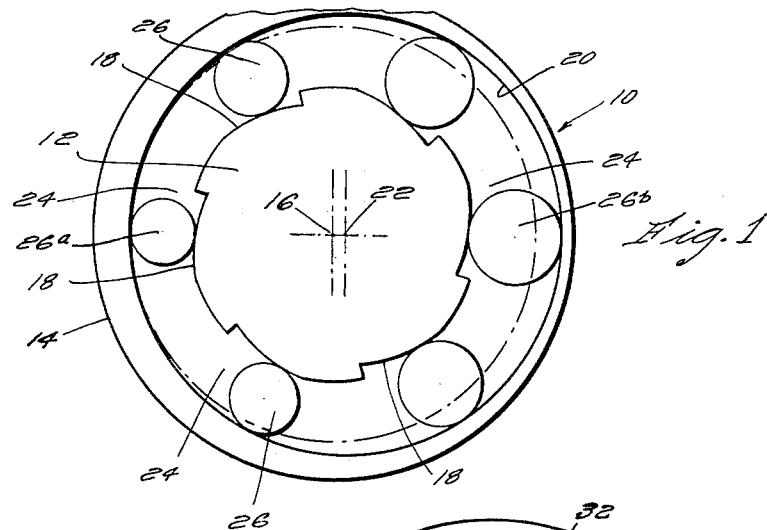
FIG. 1 is a diagrammatic view of an overrunning clutch embodying the instant invention.

It is both well known and obvious that in a conventional overrunning clutch having inner and outer races concentric with the axis of rotation of the clutch, clutching engagement of the wedging elements, whether they be rollers or sprags, will repeatedly take place at the same spot or areas on the races. By making one of the raceways eccentric with respect to the axis of rotation of the clutch, or otherwise dissimilar with respect thereto, the number of times that clutching engagement occurs at the same points on the raceways is greatly reduced. Thus, assuming that an overrunning clutch is provided having six concentric and identical camming surfaces on the inner race, six identical wedging elements, and an eccentric outer race, wedging engagement can possibly occur at the same points on the raceway six times during any one complete relative rotation of the inner and outer clutch members. This is due to the fact that after each sixty degrees of relative rotation between the inner and outer clutch members, the relative spacing of the wedging elements with respect to each other will not be varied, and hence, clutching engagement will be made with the raceways at exactly the same points as was the case before this sixty-degree relative rotation. By the same token, if twelve camming surfaces and wedging elements are provided, then identical clutching engagement would be repeated after every thirty degrees of relative rotation, or, in other words, there would be a possibility of the raceways being engaged at the same points twelve different times during one complete relative rotation. Thus, in such a situation, the possible number of times that clutching engagement can occur at the same points on the raceways is always equal to the number of wedging elements and/or camming surfaces provided.

In my aforedescribed copending application, means are provided whereby clutching engagement can occur at the same point on the raceways no more than once for every complete relative rotation of the inner and outer clutch members. This is accomplished by having the outer raceway eccentrically mounted with respect to the axis of rotation of the clutch, and in addition by having the camming surfaces on the inner raceway dissimilar with respect to each other, i.e., either by having the camming surfaces unequally spaced around the circumference of the inner race, or by having the camming surfaces unequally spaced from the axis of rotation of the clutch. In other words, the combination of an eccentric outer race and a dissimilar inner race causes the circumferential spacing of the wedging elements to change continuously during one complete relative rotation of the inner and outer clutch members whereby clutching engagement can never be made more than once at exactly the same points on the raceways during said one revolution.

It has now been found that this continual variation in the spacing between wedging elements during a complete relative rotation of the clutch parts can also be accomplished by having different size wedging elements in combination with either an eccentric outer race or a dissimilar inner race. Thus, where the wedging elements are rollers, it has been found that if each roller is of a different diameter than all of the others, and if the outer raceway is eccentric or, in the alternative, if the camming surfaces or inner raceway is dissimilar, the same desirable results are achieved as in my aforesaid copending application.

Referring now to the drawings, and more particularly to FIG. 1 thereof, there is shown a clutch 10 comprising an inner clutch member 12 and an outer clutch member 14. As will be apparent, the inner clutch member 12 is concentric and completely symmetrical with respect to the axis of rotation 16 of the clutch assembly, said inner member having at its periphery a plurality of identical camming surfaces 18.

Outer member 14 defines a circular raceway 20, it being important to note that said outer clutch member and raceway is eccentrically mounted with respect to the axis of rotation 16 of the clutch member, the center or axis of the outer clutch member being shown at 22. Thus, camming surfaces 18 and raceway 20 define a series of wedge-like spaces 24, each of said spaces having freely positioned therein a wedging element 26. It will be understood that wedging elements 26 may take the form of a roller element, ball or even a sprag, but in any event, each of said elements 26 is of a different cross-dimensional size than all the rest of said elements. Thus, viewing FIG. 1, it will be seen that the smallest wedging element is shown at 26a, and the elements become progressively larger until the largest element 26b is reached.

The form of the camming surfaces 18 is such as to provide good frictional contact with its associated wedging element when said element is in wedging contact therewith and with raceway 20 during a driving operation. I prefer to employ a camming surface having a constant rise. Such a camming surface is obtained by an Archimedian spiral. The angle for a spiral of this type is the angle formed by a tangent to the spiral at any given point on the spiral and by a straight line passing through that point and tangential to the base circle from which the spiral is generated. This angle is constant for all points along the spiral and therefore a camming surface in the form of an Archimedian spiral provides the same wedging action with a wedging element contacting therewith at any point along its surface. The tangent of the angle selected for the spiral should have a value of less than the coefficient of friction of the material of the rollers on the material of the camming surface when coated with the lubricant that is to be used.

Although FIG. 1 is merely a diagrammatic or schematic illustration of my invention, it will be understood that the construction and assembly of the clutch parts is conventional in all respects except for the features specifically above discussed, and in this connection, the construction may follow that disclosed and described in my aforesaid copending application. At the same time, spring means similar to that disclosed in my aforesaid copending case may be employed for urging the wedging elements to the narrower end of the wedge-like spaces 24, although it has been found that such urging means are not actually necessary to successful operation of the clutch.

Figure 2:
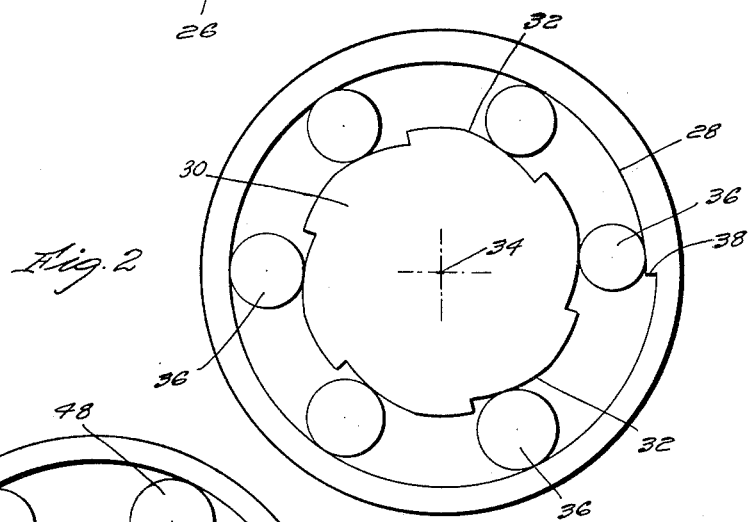
FIG. 2 is a diagrammatic illustration of a slightly modified form of my invention.

In FIG. 2 a slightly modified form of my invention is illustrated wherein the outer clutch member, instead of being circular and eccentric, now defines a spiral raceway 28. Aside from the difference that the outer raceway is a spiral instead of an eccentric circle, the structure of the clutch illustrated in FIG. 2 is identical to that of the above described clutch 10. More specifically, inner clutch member 30 and its camming surfaces 32 are concentric and completely symmetrical with respect to the axis of clutch rotation 34. Wedging elements 36 vary in size with respect to each other just as was the case in connection with the above-described elements 26. It will thus be seen that spiral trackway 28 is simply an alternative for the above-described circular and eccentric raceway 20, although not as desirable due to the necessary presence of jog 38 in the raceway. It will be understood that the term "eccentric" as used hereinafter shall be broadly construed so as to cover both the off-center circular raceway 20 and the spiral raceway 28.

Figure 3:
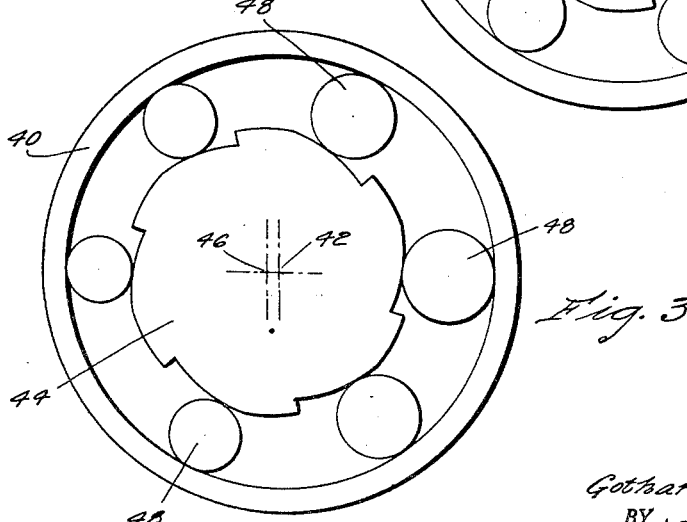
FIG. 3 is a diagrammatic illustration of still another modification.

FIG. 3 discloses still another form of my invention, and in this embodiment the only difference which exists between that of FIG. 1 is the fact that the outer clutch member and raceway 40 is concentric with respect to the axis of clutch rotation 42, whereas the inner clutch member 44 is now eccentric, it being noted that the axis of said inner clutch member is located at 46. Actually, in the form of my invention illustrated in FIG. 3, the important thing is that the inner clutch member and its camming surfaces be dissimilar with respect to each other, it being understood that the word "dissimilar" as herein used means either that said inner clutch member is eccentric as illustrated in FIG. 3, or that the camming surfaces are unequally spaced apart circumferentially or are generated from base circles of different diameters. It will be understood that the wedging elements 48 once again vary in size with respect to each other, as was the case in connection with the forms of my invention illustrated in FIGS. 1 and 2. Here again the term "eccentric" as used hereinafter shall be broadly construed so as to cover any form of "dissimilar" inner clutch member, whether the dissimilarity be an off-center mounting, camming surfaces which are unequally spaced apart circumferentially, or camming surfaces which are generated from base circles of different diameters.

It is once again emphasized that the combination of the different size wedging elements with either an eccentric or spiral raceway, or, in the alternative, with dissimilar camming surfaces, causes a constant and continuous varying of the spacing between wedging elements during one complete relative rotation of the clutch parts. This in turn insures that wedging engagement will not occur at the same point or areas on the raceway and camming surfaces more than once during 360 degrees relative rotation of the clutch parts.

It is pointed out that in the drawings the eccentricity of the inner and/or outer race, as well as the variation in size of the wedging elements, has been exaggerated for purposes of illustration. It is further pointed out that this invention is capable of numerous forms and various applications without departing from the essential features herein disclosed. It is therefore intended and desired that the specific description herein be deemed illustrative and not restrictive, and that the patent shall cover all patentable novelty herein set forth; reference being had to the following claims rather than to the particular showing herein to indicate the scope of this invention.

What is claimed is:

1. In an overrunning clutch, inner and outer clutch members rotatable on a common axis and defining a pair of opposed inner and outer raceways, one of said raceways having a series of camming surfaces cooperating with the other raceway to form a series of wedge-like spaces extending circumferentially between said members, the narrow end of each space being substantially narrower than the adjacent wide end of the next succeeding space, a wedging element freely positioned in a plurality of said spaces, whereby rotation of one of said members in one direction will cause clutching of said members so that they rotate together as a unit, while rotation in the other direction will result in overrunning, and means for insuring that said wedging elements never make clutching engagement with either of said raceways at the same point more than once during any one complete revolution of said inner and outer members with respect to each other, said means comprising the limitation that each of the aforesaid wedging elements is of a different size than all of the others, and further comprising the limitation that one of said raceways is eccentric with respect to said common axis.

2. The clutch of claim 1 further characterized in that the surface of the outer raceway is eccentric with respect to said common axis.

3. The clutch of claim 1 further characterized in that the surface of the inner raceway is eccentric with respect to said common axis.

References Cited in the file of this patent

UNITED STATES PATENTS

| | | |
|---|---|---|
| 1,292,099 | Seymour | Jan. 21, 1919 |
| 1,663,922 | Robin et al. | Mar. 27, 1928 |
| 1,708,215 | Chryst | Apr. 9, 1929 |
| 2,060,249 | Scott | Nov. 10, 1936 |
| 2,892,522 | Moo | June 30, 1959 |